(12) United States Patent
Cardoso et al.

(10) Patent No.: US 9,129,159 B2
(45) Date of Patent: Sep. 8, 2015

(54) VEHICLE HEADLIGHT STATE MONITORING METHODS, SYSTEMS AND PROCESSOR-READABLE MEDIA

(75) Inventors: George Cunha Cardoso, Webster, NY (US); Graham Pennington, Webster, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 602 days.

(21) Appl. No.: 13/488,549

(22) Filed: Jun. 5, 2012

(65) Prior Publication Data

US 2013/0321142 A1    Dec. 5, 2013

(51) Int. Cl.
  *G06K 9/00*    (2006.01)
  *B60Q 11/00*   (2006.01)
  *B60Q 1/50*    (2006.01)
  *G01M 17/007*  (2006.01)

(52) U.S. Cl.
  CPC .............. *G06K 9/00785* (2013.01); *B60Q 1/50* (2013.01); *G06K 9/00825* (2013.01); *B60Q 2300/41* (2013.01); *B60Q 2300/42* (2013.01); *G01M 17/007* (2013.01)

(58) Field of Classification Search
  CPC ........... B60Q 2300/41; B60Q 2300/42; G06K 9/00825
  See application file for complete search history.

(56) References Cited

U.S. PATENT DOCUMENTS

| 3,720,913 | A  | * | 3/1973 | Bradford ........................ 340/933 |
| 6,281,928 | B1 | * | 8/2001 | Umezaki et al. .............. 348/148 |
| 2004/0056779 | A1 | | 3/2004 | Rast |
| 2007/0221822 | A1 | | 9/2007 | Stein et al. |
| 2008/0062009 | A1 | * | 3/2008 | Marton ......................... 340/937 |
| 2008/0069400 | A1 | | 3/2008 | Zhu et al. |
| 2008/0195276 | A1 | * | 8/2008 | Stam et al. ...................... 701/36 |
| 2010/0061594 | A1 | | 3/2010 | Heinrich et al. |
| 2012/0069183 | A1 | * | 3/2012 | Aoki et al. .................... 348/148 |

* cited by examiner

*Primary Examiner* — Benjamin C Lee
*Assistant Examiner* — Rajsheed Black-Childress
(74) *Attorney, Agent, or Firm* — Kermit D. Lopez; Luis M. Ortiz; Ortiz & Lopez, PLLC

(57) ABSTRACT

A video-based vehicle headlight state monitoring method and system. A vehicle image can be captured by an image-capturing unit and converted to a grayscale image. The grayscale image can be processed to locate a front license plate and identify a position of a headlight region in front of the vehicle utilizing an algorithm. An average digital count with respect to brightness of the headlight region can be compared with average digital count with respect to brightness of several parts of the vehicle and a background region to determine the vehicle headlights ON/OFF status. The headlights can be considered ON if the digital count level of the headlight region is higher than the digital count of the several parts of the vehicle and the background region. A warning signal can be initiated to turn the headlights on during a special situation utilizing a signal generator.

20 Claims, 7 Drawing Sheets

VEHICLE HEADLIGHT STATE MONITORING METHODS, SYSTEMS AND PROCESSOR-READABLE MEDIA

TECHNICAL FIELD

Embodiments are generally related to vehicle headlight control systems and methods. Embodiments are also related to image-processing devices and techniques. Embodiments are additionally related to the verification of vehicle headlight usage.

BACKGROUND OF THE INVENTION

Headlights are usually attached to the front of a vehicle such as, for example, a car or a motorcycle with the purpose of illuminating the road ahead during periods of low visibility such as darkness or precipitation. Headlights must be turned on for night driving, during rain, snow, fog, inclement weather, and during dawn and dusk when visibility is reduced. Some states also have laws that require usage of headlights while driving through a construction zone, through a tunnel, and other special situations. Although many newer vehicles posses automatic headlights, the automatic headlights don't turn on during such special situations. Conventionally, enforcement with respect to the usage of the vehicle headlights is done visually by a law enforcement officer, either remotely or locally.

Based on the foregoing, it is believed that a need exists for improved vehicle headlight state monitoring systems and methods. A need also exists for an improved system and method for automatically verifying usage of vehicle headlights utilizing an image-capturing unit, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for vehicle headlight state monitoring methods, systems and processor-readable media.

It is another aspect of the disclosed embodiments to provide for methods, systems and processor-readable media for identifying a headlight region.

It is a further aspect of the disclosed embodiments to provide for methods, systems, and processor-readable media for automatically verifying usage of the vehicle headlight utilizing an image-capturing unit.

The aforementioned aspects and other objectives and advantages can now be achieved as described herein. Video or/and still image based vehicle headlight state monitoring methods, systems, and processor-readable media are disclosed herein. A vehicle image can be captured by an image-capturing unit and converted to a grayscale image. The grayscale image can be processed to locate a front license plate in order to identify position of a headlight region in front of the vehicle utilizing an algorithm. An average digital count with respect to brightness of the headlight region can be compared with average digital count with respect to brightness of several parts of the vehicle and a background region to determine the vehicle headlights ON/OFF status. The headlights can be considered ON if the digital count level of the headlight region is higher than the digital count of the several parts of the vehicle and the background region. A warning signal can be initiated to turn the headlights ON during a special situation utilizing a signal generator.

The license plate can also be independently identified by the image-capturing unit. The headlights can be located inside an area near the front license plate so that the position of the headlight can be determined utilizing the location of the front license plate. A sign on the road can flash reminding a driver to turn on the vehicle's headlights. The vehicle images can be later verified by a law enforcement officer to automatically flag a non-compliant vehicle to facilitate law enforcement. The flagged video or still images of the vehicles can be further reviewed by the law enforcement officer to ensure that the violation is genuine. The vehicle headlight state monitoring system enforces usage of the vehicle headlights on special situations such as, for example, darkness, rain, snow, fog, inclement weather, in construction zones, tunnels, and others areas determined by city or state regulations utilizing traffic cameras to facilitate law enforcement.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
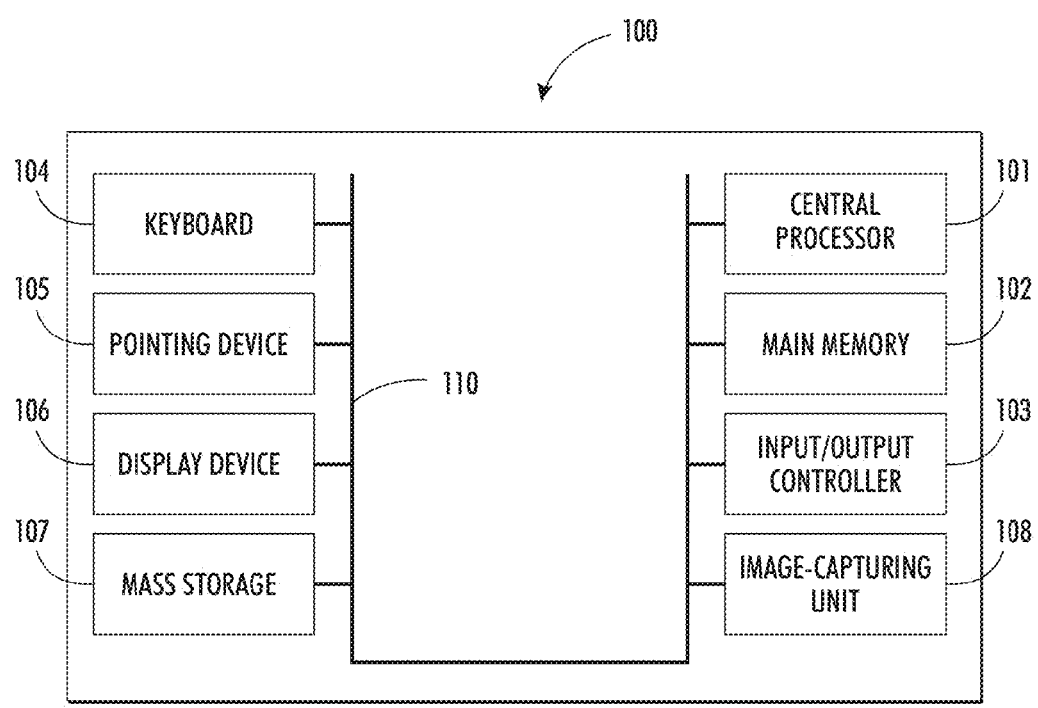
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
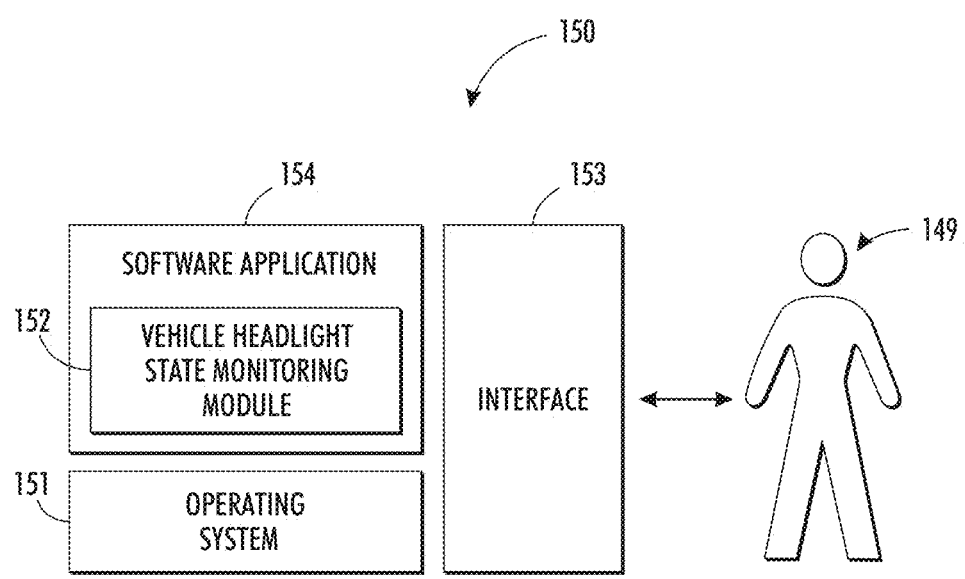
FIG. 2 illustrates a schematic view of a software system including a vehicle headlight state monitoring module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, pen device, etc.), a display device 106, a mass storage 107 (e.g., a hard disk), and image-capturing unit 108, etc. In some cases, data-processing system 100 may also include the use of peripheral connections such as, for example, a USB (universal serial bus) peripheral connection or other similar components. As illustrated, the various components of data-processing system 100 can communicate electronically through a bus 110 or other similar architecture (e.g. a system bus, a data bus). In some embodiments, the bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, a vehicle headlight state monitoring module 152 for automatically verifying usage of vehicle headlights utilizing an image-capturing unit. The vehicle "headlight on" detection module 152 can include instructions such as those of method 300 discussed herein with respect to FIG. 4.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 3:
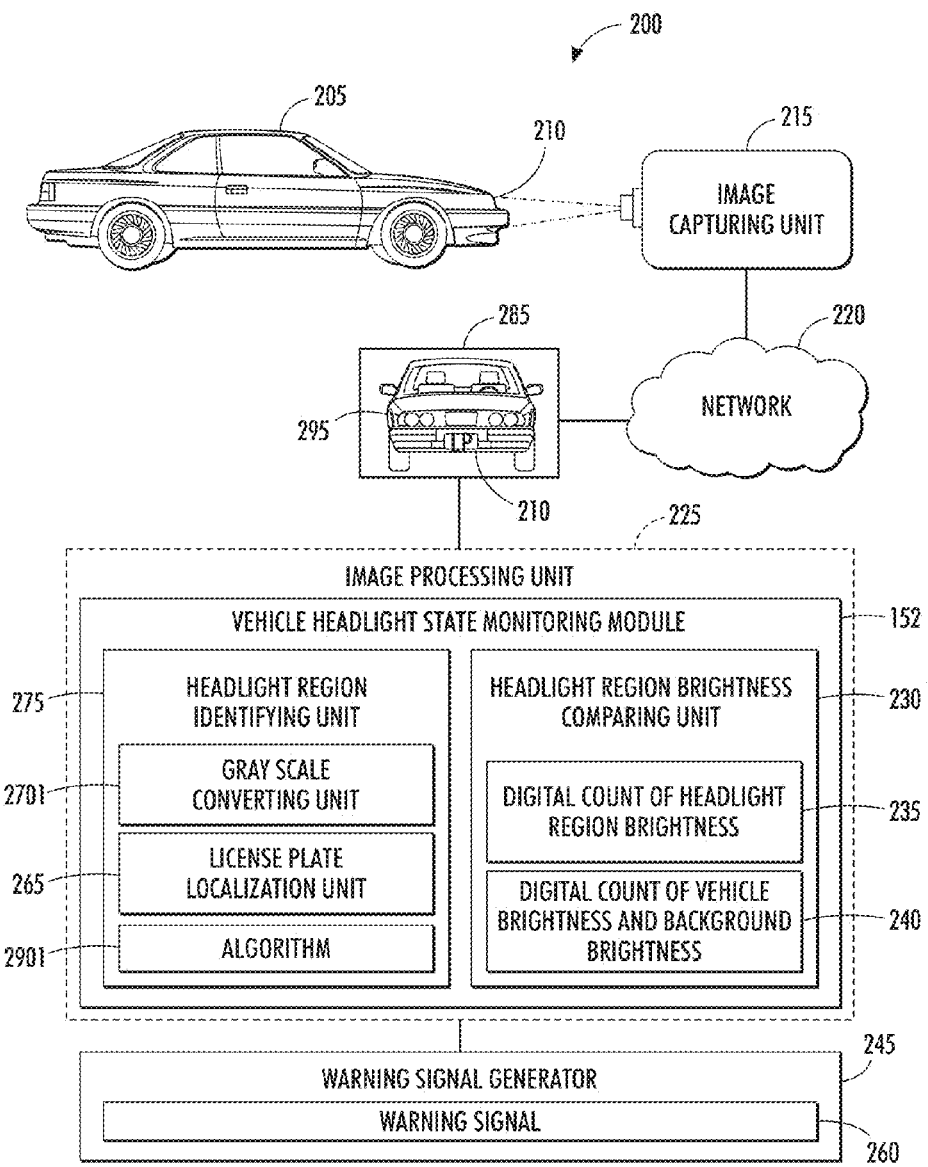
FIG. 3 illustrates a block diagram of a vehicle headlight state monitoring system, in accordance with the disclosed embodiments.

FIG. 3 illustrates a block diagram of a vehicle headlight state monitoring system 200, in accordance with the disclosed embodiments. Note that in FIGS. 1-9, identical or similar blocks are generally indicated by identical reference numerals. The vehicle headlight state monitoring system 200 generally includes an image-capturing unit 215 (e.g., camera) for capturing an image of a vehicle 205 within an effective field of view. The vehicle can be, for example, automobiles, cars, trucks, vans, buses, motor homes, tankers, motorcycles, or other vehicles, etc., as well as trailers of all kinds in-tow. The image-capturing unit 215 can be operatively connected to an image-processing unit 225 via a network 220. Note that the image-capturing unit 215 described in greater detail herein is analogous or similar to the image-capturing unit 108 of the data-processing system 100, depicted in FIG. 1. The image-capturing unit 215 may include built-in integrated functions such as image-processing, data formatting, and data compression functions. Also, the unit 215 can include imager-positioning, range-finding, and flash bulb features or components.

Note that the network 220 may employ any network topology, transmission medium, or network protocol. The network 220 may include connections such as wire, wireless communication links, or fiber optic cables. Network 220 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The image-capturing unit 215 can communicate electronically (e.g., wirelessly, wired, etc.) with the image-processing unit 225 to continuously monitor traffic within an effective field of view. In some embodiments, the image-capturing unit 215 may actually be integrated with the image-processing unit 225, while in other embodiments, the image-capturing unit 215 may be located remotely from the image processing-unit 225 or maybe co-located with unit 225, but constitutes a separate component or module. The image-processing unit 225 can receive a captured image 285 of the vehicle 205 from the image-capturing unit 215 in order to process the image 285. In some embodiments, the image-processing unit 225 can be implemented in the context of a small, handheld computer device or palmtop computer or other data-processing system (e.g. system 100 depicted in FIG. 1) that provides portability and is adapted for easy mounting. The image-capturing unit 215 can capture multiple images (e.g., front and rear license plate images) as the vehicle 205 passes through an observation zone and the image-processing unit 225 processes each image thereof.

The image-processing unit 225 can be configured to include a vehicle headlight state monitoring module 152, which in turn can include a number of modules/units such as, for example, a headlight region identifying unit or module 275, and a headlight region brightness comparing unit or module 230. The headlight region identifying unit 275 can further include, for example, a gray scale converting unit or module 2701, a license plate localization unit 265, and an algorithm unit or module 2901. The headlight region brightness comparing unit 230 can include, for example, a module 235 for calculating/generating a digital count of a headlight region brightness. The headlight region brightness comparing module can further include a module 240 for calculating/generating a digital count of the brightness of a vehicle (or vehicles) such as vehicle 205 and background brightness thereof. The image-processing unit 225 can further communicate with a warning signal generator 245, which is capable of generating a warning signal 260.

The automated license plate localization unit or module 265 can thus be integrated and/or communicate with the vehicle headlight state monitoring module 152 to automatically verify the usage of vehicle headlights utilizing the image-capturing unit 215. It can be appreciated that the headlight region identifying unit 275 and the headlight region brightness comparing unit 230 can be implemented as software modules.

The image-capturing unit 215 can capture the vehicle image 285 and the gray scale converting unit 2701 can covert the image 285 into a grayscale image. The image-processing unit 225 and the headlight region identifying unit 275 can process the grayscale image to locate the front license plate 210 of the vehicle 205 in order to identify the position of a headlight region 295 in front of the vehicle 205 utilizing an algorithm processed via the algorithm module 2901. Note that the position of the headlight can also be determined utilizing the location of the front license plate 210.

The headlight region brightness comparing unit 230 compares an average digital count with respect to brightness of the headlight region 295 with average digital count with respect to brightness of several parts of the vehicle 205 and a background region 240 to determine the vehicle headlight ON/OFF status. If the digital count level of the headlight region 295 is higher than the digital count of the vehicle region and the background region 240, there is a very high probability that the headlight is 'on'. Otherwise the headlights are off.

The headlight state monitoring system 200 further includes a warning signal generator 245 to initiate a warning signal 260 to turn headlight ON when headlights on are mandatory. A sign on the road can flash reminding a driver to turn on the vehicle's headlights. The vehicle images 285 can be later verified by a law enforcement officer to automatically flag a non-compliant vehicle to facilitate law enforcement. The flagged vehicles can be further reviewed by the law enforcement officer to ensure that the violation is genuine.

Figure 4:
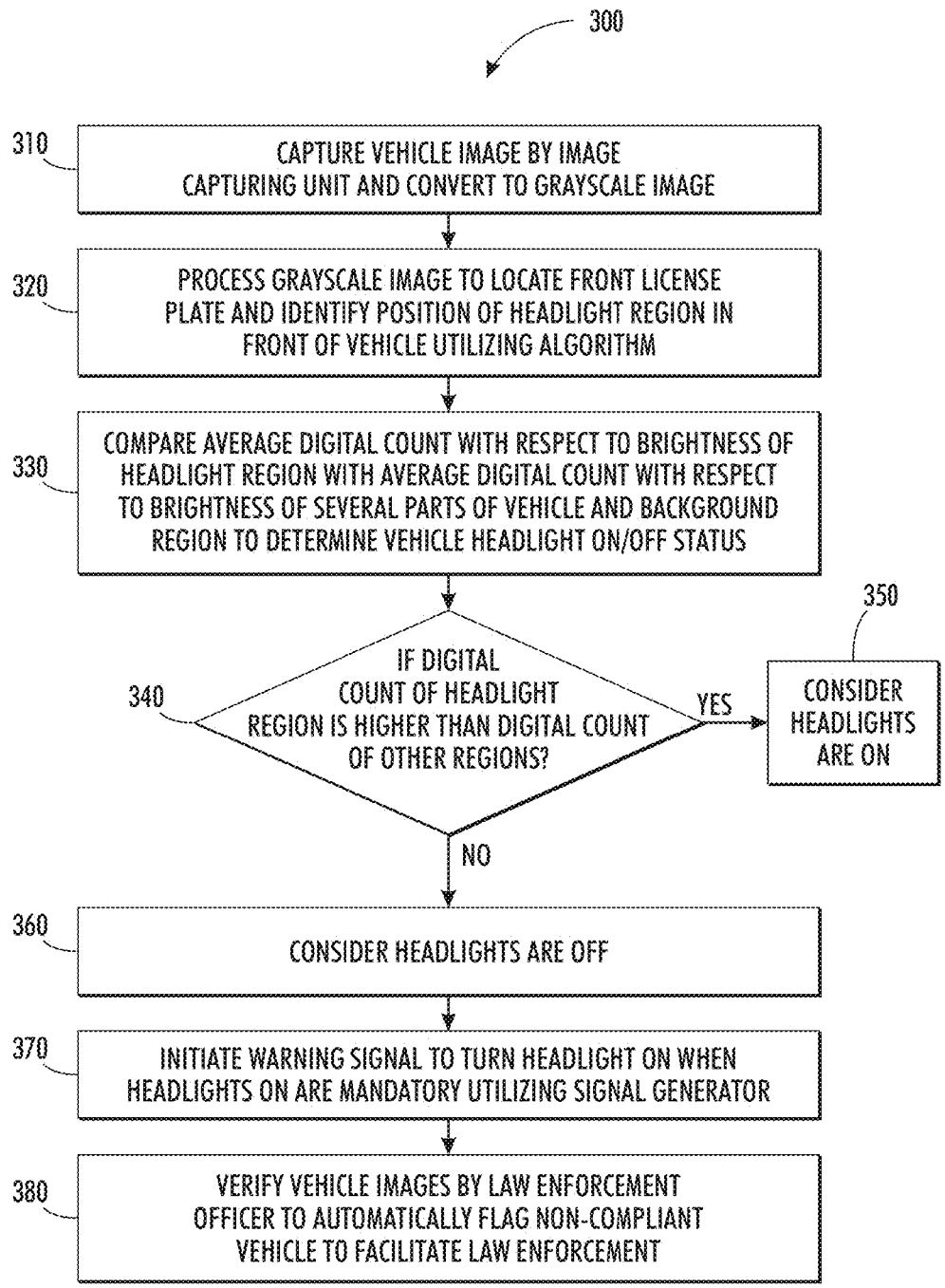
FIG. 4 illustrates a high level flow chart of operations illustrating logical operational steps of a method for automatically verifying usage of vehicle headlights utilizing an image-capturing unit, in accordance with the disclosed embodiments.

FIG. 4 illustrates a high-level flow chart of operations illustrating logical operational steps of a method 300 for automatically verifying usage of the vehicle headlights utilizing the image-capturing unit 215, in accordance with the disclosed embodiments. As shown at block 310, the vehicle image (e.g., image 285 shown in FIG. 3) can be captured by the image-capturing unit 215 and converted into a grayscale image. The grayscale image can be processed to locate, for example, the front license plate 210 and also to identify the position of the headlight region 295 in front of the vehicle 205 utilizing the algorithm module 2901, as depicted at block 320. Thereafter, as shown at block 330, the average digital count with respect to the brightness of the headlight region can be compared to the average digital count of the brightness of several (one or more) parts of the vehicle and background region thereof to determine the vehicle headlight status (i.e, ON or OFF).

Following the process of the operation shown at block 330, a test can be performed to determine if the digital count of the headlight region is higher than the digital count of other regions. If so, it is determined or considered that the headlights are ON, as shown at block 350. If not, then as shown at block 360, the headlights are determined or considered to be OFF. Thereafter, as depicted at block 370, an operation can be implemented to initiate one or more warning signals (e.g., warning signal 260 shown in FIG. 3) to activate the headlight when headlights are mandatory. The warning signal generator 245 shown in FIG. 3 can be utilized with respect to the operation shown at block 370. Next, as indicated at block 380, an operation can be implemented to verify one or more vehicle images by law enforcement officer(s) to automatically flag non-compliant vehicles to facilitate law enforcement. That is, a law enforcement officer can optionally double-check the recorded image of the automatically flagged vehicle (e.g., a violator) to avoid mistakenly giving a ticket to a vehicle that had its headlights on. This is useful because the human eye is generally more reliable in distinguishing a headlight "on" from "off" than a software instruction.

Figure 5:
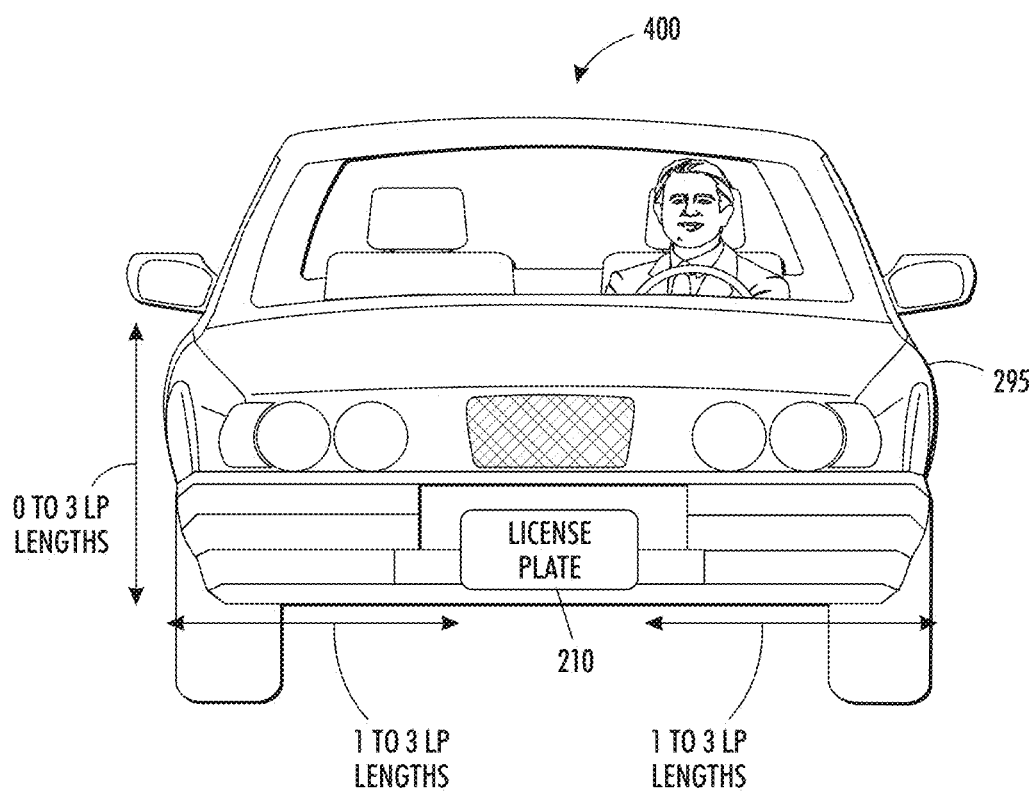
FIG. 5 illustrates a schematic view of a headlight region near a front license plate, in accordance with the disclosed embodiments.

FIG. 5 illustrates a schematic diagram 400 of the headlight region 295 near the front license plate 210, in accordance with the disclosed embodiments. As shown in the schematic diagram 400, headlights can be located inside of an area near the front license plate 210 so that the position of the headlight can be determined utilizing the location of the front license plate 210. An average digital count with respect to brightness of the headlight region 295 can be compared with average digital count with respect to brightness of several parts of the vehicle 205 and a background region to determine the vehicle headlight ON/OFF status.

A determination can be made if the digital count with respect to brightness of the headlight region 235 is higher than the digital count with respect to brightness of other regions 240. If the digital count with respect to brightness of the headlight region 235 is higher than the digital count with respect to brightness of other regions 240, the headlights are considered ON. Otherwise, the headlights are considered OFF and a warning signal 260 can be initiated to turn the headlight ON when headlights on are mandatory utilizing the signal generator 245. The vehicle images 285 can be later verified by a law enforcement officer to automatically flag a non-compliant vehicle to facilitate law enforcement. Such an approach automatically verifies the usage of the vehicle headlights for law enforcement purpose.

Figure 6:
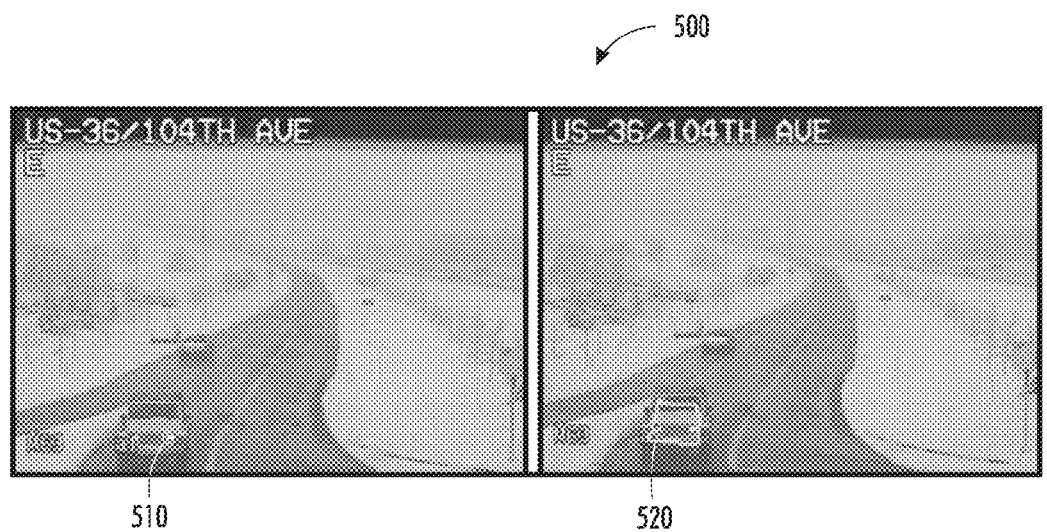
FIGS. 6-9 illustrate a perspective view of a vehicle image showing a headlight region and headlight ON/OFF status, in accordance with the disclosed embodiments.

FIG. 6 illustrates a vehicle image 500 showing a headlight region 510 and a headlight ON/OFF status, in accordance with the disclosed embodiments. The image 500 can be converted to grayscale before image-processing. The bright position 510 can be identified as a headlight. The average digital count of the selected area 510 can be compared to the average digital count (surrogate for brightness) of front of the vehicle 520 and of the landscape as a whole. For example, the average digital count of the headlight region is calculated as 195.1724, front of car is 134.9154, and the whole scene is 175.3903. The digital count of the headlights is greater than the digital count of the front of vehicle which is greater than or equal to the digital count of the whole scene. Hence the headlights are considered ON.

Figure 7:
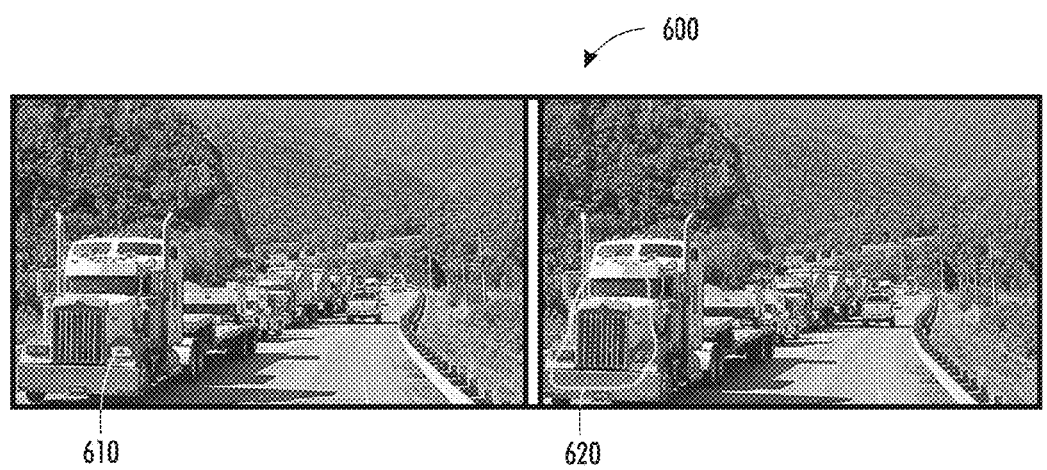

FIG. 7 illustrates images of a truck 600 with the headlights OFF, in accordance with the disclosed embodiments. The result of image-processing is shown below in equation (1).

$$\text{headlights\_ROI}=94.5368; \text{Front of vehicle}=106.1966; \text{whole scene}=108.8818 \rightarrow \text{headlights off} \quad (1)$$

The digital count of the headlight region 610 is lower than the digital count of front of vehicle 620 which is greater than the digital count of the whole scene. Hence the headlights are considered OFF.

Figure 8:
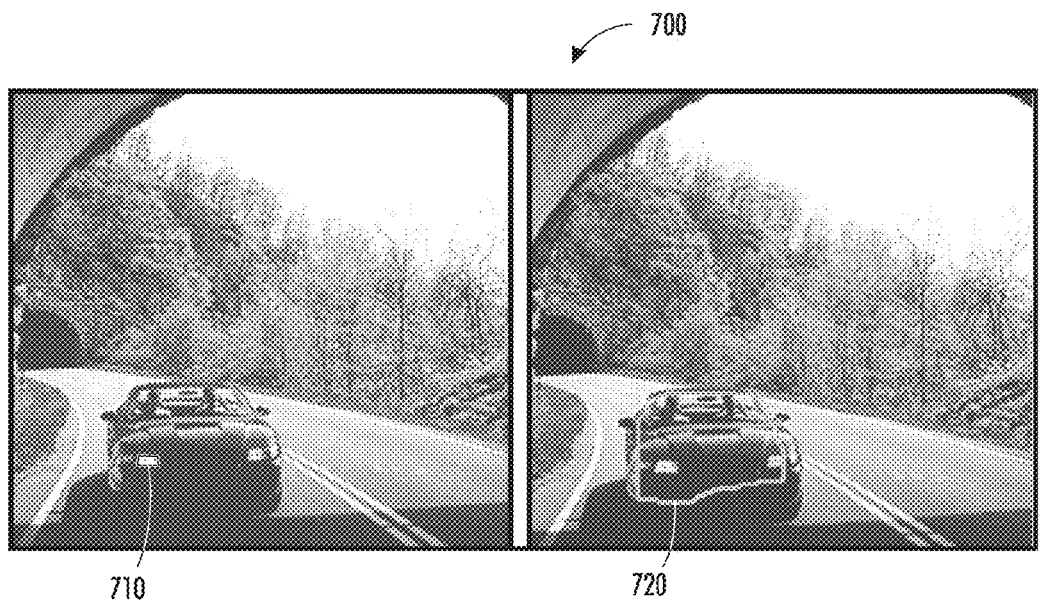

FIG. 8 illustrates an image of a vehicle 700 at an entrance of a tunnel, in accordance with the disclosed embodiments. The result of image-processing is illustrated below in equation (2).

$$\text{headlights\_ROI}=199.7313; \text{Front of vehicle}=59.4425; \text{whole scene}=121.8854 \rightarrow \text{headlights on} \quad (2)$$

The digital count of the headlights 710 is greater than the digital count of front of vehicle 720 which is greater than or equal to the digital count of the whole scene. Hence the headlights are considered ON.

Figure 9:
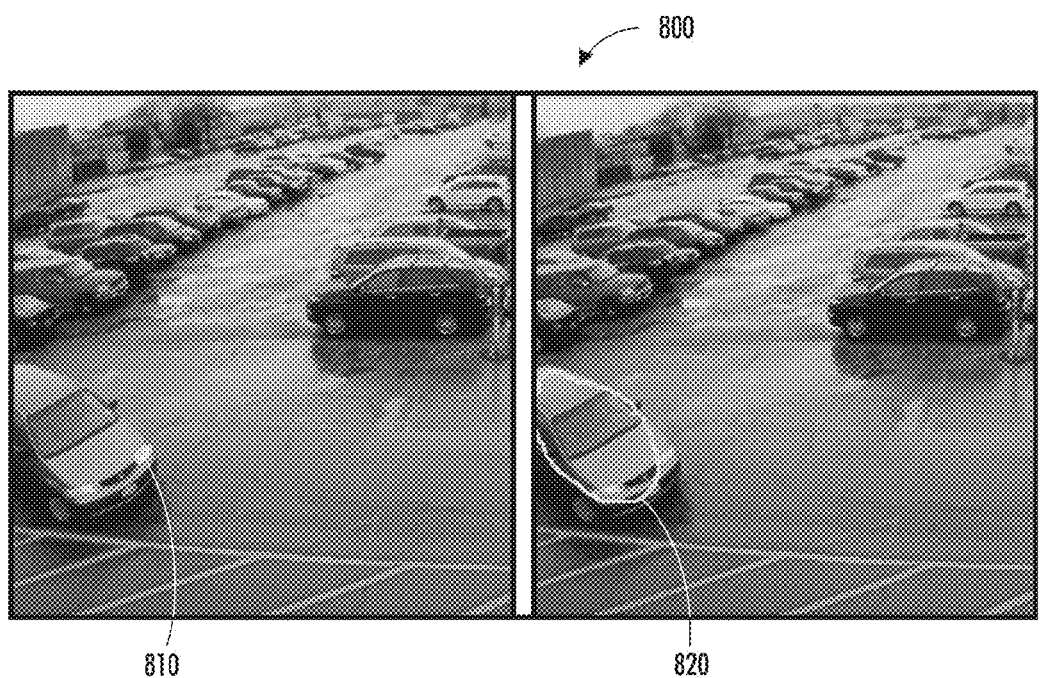

FIG. 9 illustrates an image of a vehicle 800 captured by an image-capturing unit mounted on a pole in front of a building, in accordance with the disclosed embodiments. The result of image-processing is illustrated below in equation (3).

$$\text{headlights\_ROI}=202.7215; \text{Front of vehicle}=104.3374; \text{whole scene}=104.1359 \rightarrow \text{headlights on} \quad (3)$$

The digital count of the headlights 810 is greater than the digital count of front of vehicle 820 which is greater than or equal to the digital count of the whole scene. Hence the headlights are considered ON. The vehicle headlight state monitoring system 200 enforces usage of the vehicle headlights on special situations such as, for example, darkness, rain, snow, fog, inclement weather, in construction zones, tunnels, and other areas determined by city or state regulations utilizing traffic cameras to facilitate law enforcement.

Based on the foregoing, it can be appreciated that a number of embodiments, both preferred and alternative, are disclosed herein. In one embodiment, for example, a method for monitoring usage of headlights of a vehicle can be implemented, which includes the steps of, for example: converting an image of a vehicle into a grayscale image; processing the grayscale image to locate a front license plate of the vehicle to identify an area of the vehicle where the headlights are most likely to be located; and comparing an average digital count with respect to a brightness of the headlight region to an average digital count with respect to a brightness of a plurality of parts of the vehicle and a background region to determine an ON status and an OFF status of the headlights associated with the vehicle.

In another embodiment, for example, a step can be provided for considering the headlights as ON if the digital count level of the headlight region is higher than the digital count of the plurality of parts of the vehicle and the background region. In still another embodiment, a step can be provided for considering the headlights as OFF if the digital count level of the headlight region is lower than the digital count of the plurality of parts of the vehicle and the background region. In yet other embodiments, a step can be provided for initiating a warning signal to turn the headlights ON during a special situation utilizing a signal generator to facilitate law enforcement.

In other embodiments, a step can be provided for determining a position of the headlight region utilizing location of the front license plate wherein the headlights are located inside an area near the front license plate. In still another embodiment, a step can be provided for automatically reminding a driver to turn on the headlights by flashing a sign on a road. In other embodiments, steps can be provided for verifying the vehicle image by a law enforcement officer to automatically flag a non-compliant vehicle to facilitate law enforcement, and reviewing the vehicle image of the non-compliant vehicle to ensure that a violation thereof is genuine.

In another embodiment, a system can be implemented for monitoring usage of headlights of a vehicle. Such a system can include, for example, a processor, a data bus coupled to the processor; and a computer-usable medium embodying computer program code, the computer-usable medium being coupled to the data bus. The computer program code can include instructions executable by the processor and configured, for example, for converting an image of a vehicle into a grayscale image; processing the grayscale image to locate a front license plate of the vehicle to identify an area of the vehicle where the headlights are most likely to be located; and comparing an average digital count with respect to a brightness of the headlight region to an average digital count with respect to a brightness of a plurality of parts of the vehicle and a background region to determine an ON status and an OFF status of the headlights associated with the vehicle.

In another embodiment, such instructions can be configured for considering the headlights as ON if the digital count level of the headlight region is higher than the digital count of the plurality of parts of the vehicle and the background region. In still another embodiment, such instructions can be configured for considering the headlights as OFF if the digital count level of the headlight region is lower than the digital count of the plurality of parts of the vehicle and the background region. In yet another embodiment, such instructions can be configured for initiating a warning signal to turn the headlights ON during a special situation utilizing a signal generator to facilitate law enforcement. In still other embodiments, such instructions can be configured for determining a position of the headlight region utilizing location of the front license plate wherein the headlights are located inside an area near the front license plate. In yet another embodiment, such instructions can be configured for reminding a driver to turn on the headlights by flashing a sign on a road. In still another embodiment, such instructions can be configured for verifying the vehicle image by a law enforcement officer to automatically flag a non-compliant vehicle to facilitate law enforcement and reviewing the vehicle image of the non-compliant vehicle to ensure that a violation thereof is genuine.

In another embodiment, a processor-readable medium storing code representing instructions to cause a process for monitoring usage of headlights of a vehicle can be implemented. Such code can include code to, for example: convert an image of a vehicle into a grayscale image; process the grayscale image to locate a front license plate of the vehicle to identify an area of the vehicle where the headlights are most likely to be located; and compare an average digital count with respect to a brightness of the headlight region to an average digital count with respect to a brightness of a plurality of parts of the vehicle and a background region to determine an ON status and an OFF status of the headlights associated with the vehicle.

In another embodiment, such code can include code to consider the headlights as ON if the digital count level of the headlight region is higher than the digital count of the plurality of parts of the vehicle and the background region. In yet another embodiment, such code can include code to consider the headlights as OFF if the digital count level of the headlight region is lower than the digital count of the plurality of parts of the vehicle and the background region. In other embodiments, such code can include code to initiate a warning signal to turn the headlights ON during a special situation utilizing a signal generator to facilitate law enforcement. In yet other embodiments, such code can include code to determine the position of the headlight region utilizing location of the front license plate wherein the headlights are located inside an area near the front license plate. In another embodiment, such code can include code to remind a driver to turn on the headlights by flashing a sign on a road.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for monitoring usage of headlights of a vehicle, said method comprising:
converting an image of a vehicle into a grayscale age via a gray scale converting unit;
processing said grayscale image via an image-processing unit and a headlight region identifying unit to locate a front license plate of said vehicle to identify an area of said vehicle where said headlights are most likely to be located, said headlight region identifying unit comprising said gray scale converting unit; and
comparing an average digital count with respect to a brightness of said headlight region to an average digital count with respect to a brightness of a plurality of parts of said vehicle and a background region to determine an ON status and an OFF status of the headlights associated with said vehicle.

2. The method of claim 1 further comprising considering said headlights as ON if said digital count level of said headlight region is higher than said digital count of said plurality of parts of said vehicle and said background region.

3. The method of claim 2 further comprising considering said headlights as OFF if said digital count level of said headlight region is lower than said digital count of said plurality of parts of said vehicle and said background region.

4. The method of claim 2 further comprising initiating a warning signal to turn said headlights ON during a special situation utilizing a warning signal generator to facilitate law enforcement.

5. The method of claim 4 further comprising determining a position of said headlight region utilizing a location of said front license plate wherein said headlights are located inside an area near said front license plate.

6. The method of claim 4 further comprising reminding a driver to turn on said headlights by flashing a sign on a road.

7. The method of claim 6 further comprising:
verifying said vehicle image to automatically flag a non-compliant vehicle to facilitate law enforcement; and
reviewing said vehicle image of said non-compliant vehicle to ensure that a violation thereof is genuine.

8. A system for monitoring usage of headlights of a vehicle, said system comprising:
a processor;
a data bus coupled to said processor; and
a non-transitory computer-usable medium embodying computer program code, said computer-usable medium being coupled to said data bus, said computer program code comprising instructions executable by said processor and configured for:
converting an image of a vehicle into a grayscale image via a gray scale converting unit;
processing said grayscale image via an image-processing unit and a headlight region identifying unit to locate a front license plate of said vehicle to identify an area of said vehicle where said headlights are most likely to be located, said headlight region identifying unit comprising said gray scale converting unit; and
comparing an average digital count with respect to a brightness of said headlight region to an average digital count with respect to a brightness of a plurality of parts of said vehicle and a background region to determine an ON status and an OFF status of the headlights associated with said vehicle.

9. The system of claim 8 wherein said instructions are further configured for considering said headlights as ON if said digital count level of said headlight region is higher than said digital count of said plurality of parts of said vehicle and said background region.

10. The system of claim 9 wherein said instructions are further configured for considering said headlights as OFF if said digital count level of said headlight region is lower than said digital count of said plurality of parts of said vehicle and said background region.

11. The system of claim 9 wherein said instructions are further configured for initiating a warning signal to turn said headlights ON during a special situation utilizing a signal generator to facilitate law enforcement.

12. The system of claim 11 wherein said instructions are further configured for determining a position of said headlight region utilizing location of said front license plate wherein said headlights are located inside an area near said front license plate.

13. The system of claim 11 wherein said instructions are further configured for reminding a driver to turn on said headlights by flashing a sign on a road.

14. The system of claim 12 wherein said instructions are further configured for:
verifying said vehicle image to automatically flag a non-compliant vehicle to facilitate law enforcement; and
reviewing said vehicle image of said non-compliant vehicle to ensure that a violation thereof is genuine.

15. A non-transitory processor-readable medium storing code representing instructions to cause a process for monitoring usage of headlights of a vehicle, said code comprising code to:
convert an image of a vehicle into a grayscale image via a gray scale converting unit;
process said grayscale image via an image-processing unit and a headlight region identifying unit to locate a front license plate of said vehicle to identify an area of said vehicle where said headlights are most likely to be located, said headlight region identifying unit comprising said gray scale converting unit; and
compare an average digital count with respect to a brightness of said headlight region to an average digital count with respect to a brightness of a plurality of parts of said vehicle and a background region to determine an ON status and an OFF status of the headlights associated with said vehicle.

16. The processor-readable medium of claim 15 wherein said code further comprises code to consider said headlights as ON if said digital count level of said headlight region is higher than said digital count of said plurality of parts of said vehicle and said background region.

17. The processor-readable medium of claim 16 wherein said code further comprises code to consider said headlights as OFF if said digital count level of said headlight region is lower than said digital count of said plurality of parts of said vehicle and said background region.

18. The processor-readable medium of claim 17 wherein said code further comprises code to initiate a warning signal to turn said headlights ON during a special situation utilizing a signal generator to facilitate law enforcement.

19. The processor-readable medium of claim 17 wherein said code further comprises code to determine a position of said headlight region utilizing location of said front license plate wherein said headlights are located inside an area near said front license plate.

20. The processor-readable medium of claim 19 wherein said code further comprises code to remind a driver to turn on said headlights by flashing a sign on a road.

* * * * *